Aug. 6, 1929.  C. F. SMITH  1,723,258
MACHINE FOR MAKING SPIRALLY WOUND TUBES
Filed Sept. 18, 1926   6 Sheets-Sheet 1

Fig. 1.

INVENTOR
Charles F. Smith
BY Wilbur M. Stone
his ATTORNEY

Aug. 6, 1929.  C. F. SMITH  1,723,258
MACHINE FOR MAKING SPIRALLY WOUND TUBES
Filed Sept. 18, 1926   6 Sheets-Sheet 3

INVENTOR
Charles F. Smith
BY Wilbur M. Stone
his ATTORNEY

Patented Aug. 6, 1929.

1,723,258

UNITED STATES PATENT OFFICE.

CHARLES F. SMITH, OF BROOKLYN, NEW YORK, ASSIGNOR TO PUBLIC SERVICE CUP COMPANY, OF BROOKLYN, NEW YORK, A CORPORATION OF NEW YORK.

MACHINE FOR MAKING SPIRALLY-WOUND TUBES.

Application filed September 18, 1926. Serial No. 136,231.

This invention relates to machines for making spirally-wound tubes and has for its object to provide a machine of the class specified which may be operated at high speed with a minimum of attention and liability to derangement.

With these and other objects in view, which will appear later herein, my improvements comprise features illustrated in one embodiment thereof and which may be the preferred embodiment, in the drawings which accompany this specification, wherein:

Figures 1 and 2 are to one scale; the scale of Figs. 3 to 8 inclusive and of Fig. 10 is about twice that of Figs. 1 and 2 and the scale of Fig. 9 is about one and one half times that of Figs. 1 and 2.

The particular character of tube for the production of which the machine of the present invention is provided, comprises a plurality of relatively narrow strips of sheet material, preferably paper, the first of which is wound spirally about a mandrel and preferably is delivered onto the mandrel at such an angle as to cause the leading edge of the strip to lie in close proximity to or in contact with the rear edge of the last mandrel-enwrapping portion of the strip, whereby a one thickness substantially continuous tube is formed. With a given width of strip, by varying the angle of delivery onto the mandrel, space may be left between adjacent strip wrappings, or said strip may be caused to slightly overlap the preceding wrapping, but for quality of product edge contact of the successive wrappings is preferred.

The tube is completed by winding spirally in the same direction thereon, one or more strips similar to that of which the one thickness tube is formed. The second strip is preferably of the same width as the first strip and is preferably laid at the same angle and in parallelism therewith; but it is so directed onto the under tube as to overlap the adjacent joining edges of the successive convolutions of said under tube. Usually one additional strip is sufficient and the present machine is illustrated as provided for laying two strips only. Said additional strip is provided with an adhesive upon that side thereof which contacts with the previously laid strip, whereby it is caused to adhere to the under strip, thus forming a continuous two thickness tube.

Figure 1:
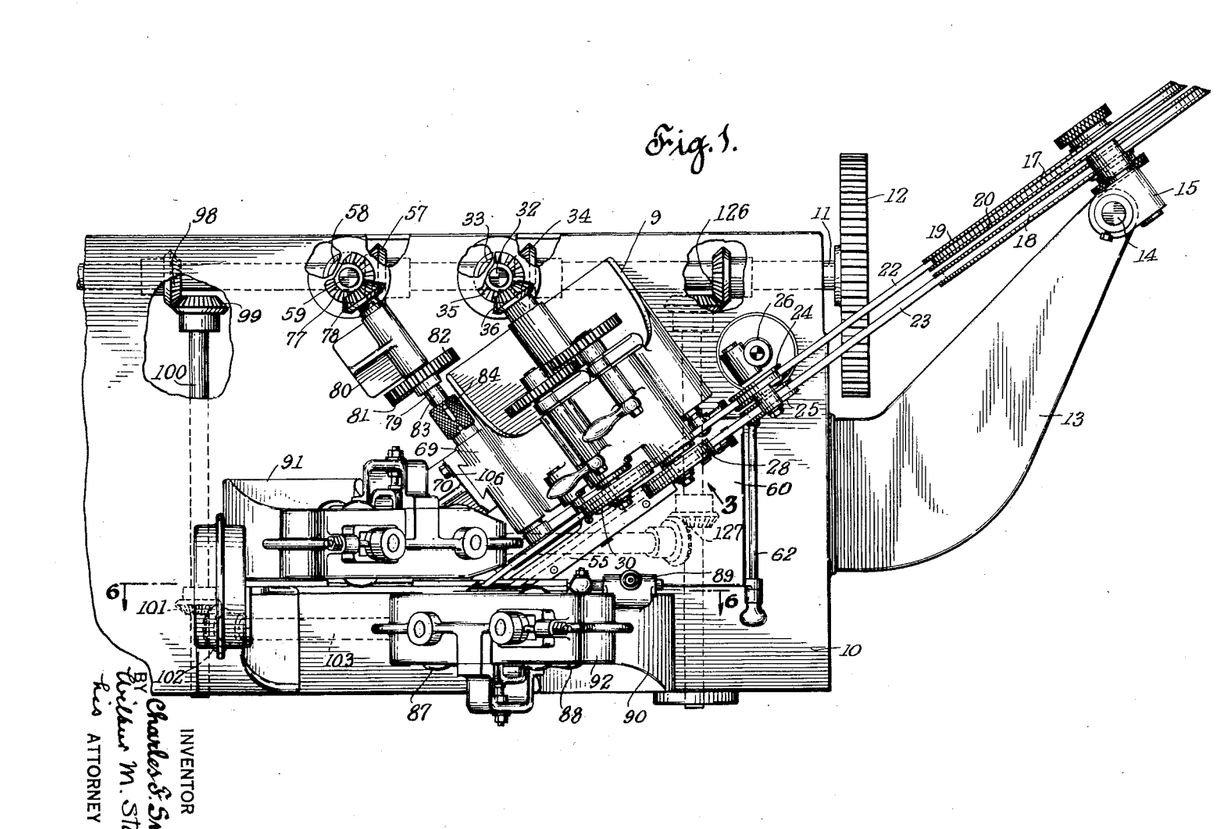
Figure 1 is a plan view of a machine for making spirally-wound tubes embodying my improvements.

Directing attention now to the drawings, hollow base 10 has main shaft 11 suitably mounted for rotation inside, near its rear, Fig. 1, and power may be supplied to said shaft from some convenient source, not shown, through gear 12 fixed to the right hand end thereof. From said shaft 11 the various sub-mechanisms are driven through gearing to be described in detail later herein.

*Strip supply.*

On bracket 13 protruding rearwardly from the right hand end of base 10 is upright post 14, on which are adjustably fixed brackets 15, 16 for carrying on suitable horizontal studs upper and lower rolls of paper strips 17, 18 respectively. As these strips are relatively narrow, the rolls are preferably sustained between discs as 19, 20 for roll 17. These rolls are set in angular relation to bed 10, Fig. 1, and mandrel 21, Fig. 9, so that the strips may be delivered spirally about said mandrel. Strip 22, in unwound from the lower portion of upper roll 17 and strip 23 is unwound from the upper portion of lower roll 18 so as to be conveniently delivered into the same plane, Fig. 2, to their respective feed rolls. Also upper roll 17 is offset slightly to the rear, relatively to lower roll 18, Fig. 1, so that the strips are delivered side by side, in parallelism to their respective feed rolls. Strip 22 is directed to its feed rolls under flanged guide roll 24 and strip 23 is similarly directed to its feed rolls over flanged guide roll 25. Said guide rolls are mounted for free rotation on studs fixed in brackets 26, 27 adjustably fixed to upright post 8 mounted on the top of base 10, Figs. 1, 2 and 3.

Strip feeding mechanism.

Figure 3:
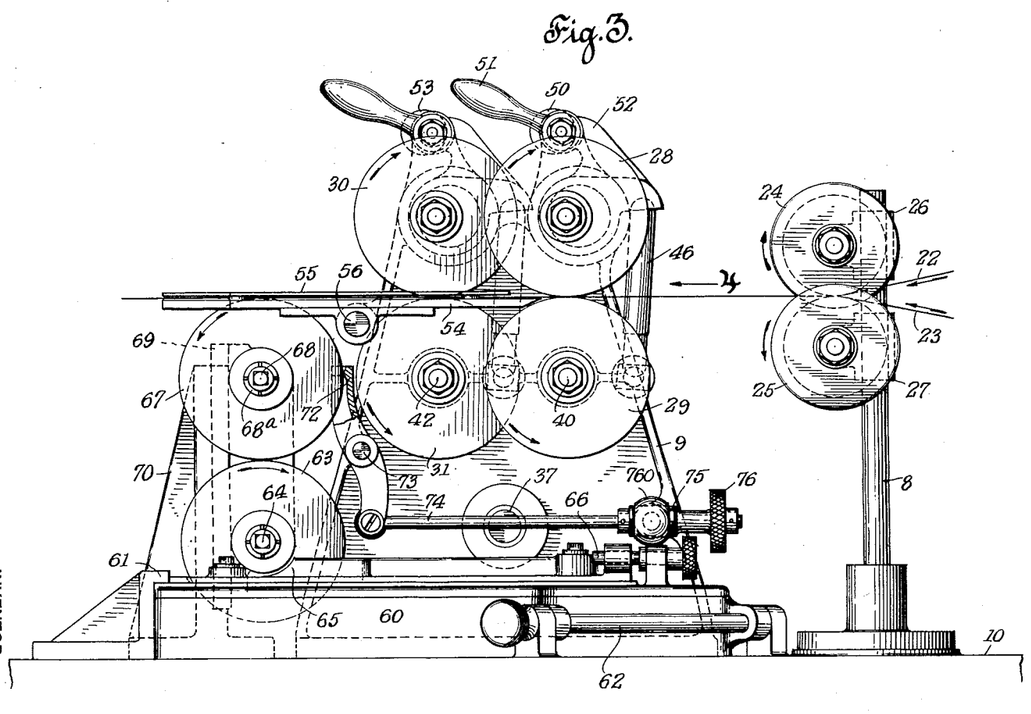
Fig. 3 is an angular elevation of part of the mechanism, looking in the direction of arrow 3, Fig. 1.
Figures 4, 5:
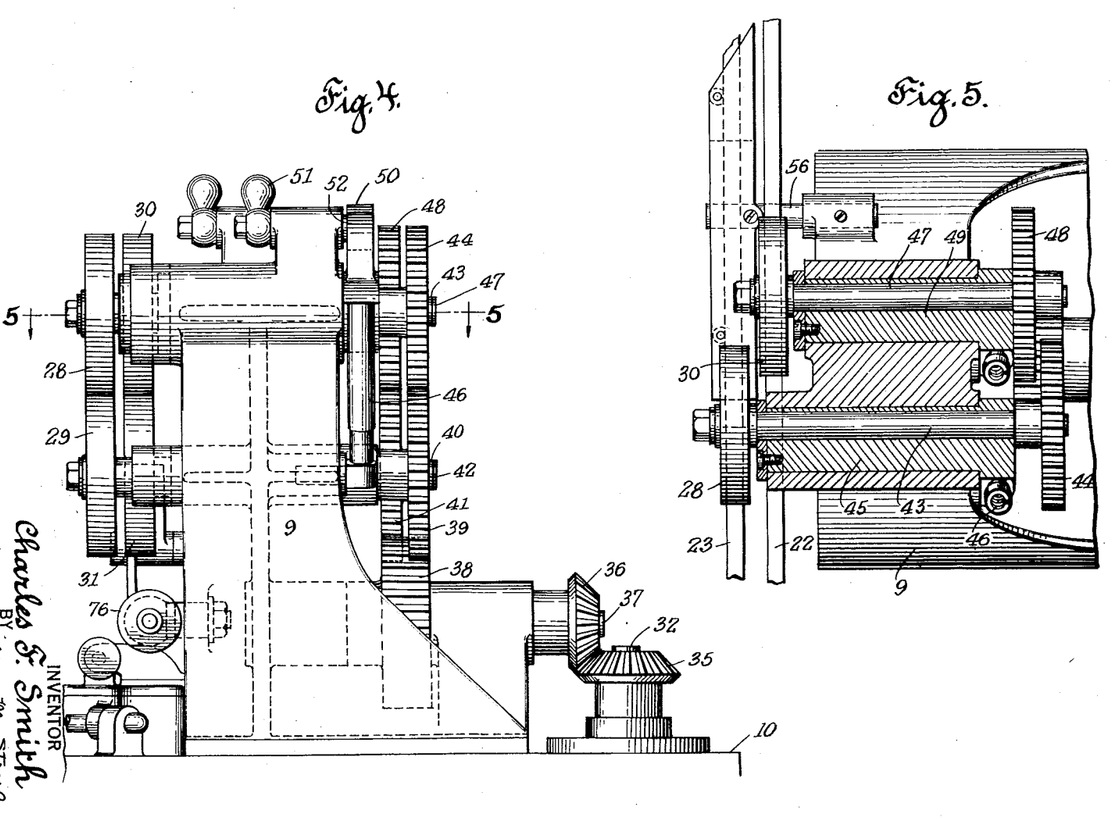
Fig. 4 is an end elevation looking in the direction of arrow 4, Fig. 3.
Fig. 5 is a sectional plan view on line 5—5 of Fig. 4.

The strip feeding mechanism is erected upon sub-base 9, shown in its relation to the whole machine in the plan view of Fig. 1 and in detail in Figs. 3, 4 and 5. Said feed mechanism is set in angular relation to base 10, on which it is mounted, so as to receive the strips in line with the strip supply from rolls 17 and 18. For advancing the first or under strip 23, upper and lower coacting feed rolls 28, 29 are provided and for advancing the second or outer strip 22, upper and lower coacting feed rolls 30, 31 are provided. Lower feed rolls 29 and 31 are on fixed axes and upper rolls 28 and 30 are on axes eccentrically mounted and spring urged to coaction with said lower feed rolls 29, 31 respectively.

Upstanding from base 10 is vertical shaft 32, Figs. 1 and 4, to the lower end of which is fixed miter gear 33 meshing with and driven by miter gear 34 fixed to main shaft 11. Fixed to the upper end of shaft 32 is miter gear 35 meshing with and driving miter gear 36 fixed to the rear end of horizontal shaft 37, Fig. 4. Midway the length of shaft 37 is fixed wide spur gear 38 meshing with and driving, on the one hand, gear 39 fixed to the rear end of shaft 40, to the forward end of which shaft lower feed roll 29 is fixed. On the other hand gear 41 fixed to the outer end of shaft 42 also meshes with and is driven by wide gear 38. To the forward end of shaft 42 is fixed lower feed roll 31. Upper feed roll 28 is fixed to the forward end of shaft 43 and gear 44, meshing with and driven by gear 39 therebelow, is fixed to the rear end of said shaft, Fig. 5. Said shaft 43 is mounted for rotation in eccentric sleeve 45 and said sleeve is urged by spring plunger 46, to thrust feed roll 28 to coaction with feed roll 29 therebelow. Upper feed roll 30 is similarly fixed to the forward end of shaft 47 and gear 48 fixed to the rear end of said shaft, meshes with and is driven by gear 41. Shaft 47 is rotatably mounted in eccentric sleeve 49, spring urged to cause upper feed roll 30 to coact with lower feed roll 31, in all respects similar to the described means for rolls 28, 29. For temporarily relieving the tension of spring plunger 46 and lifting roll 28 from coaction with roll 29, cam 50 may be rocked by lever 51 to throw to the right, Fig. 3, ear 52 of eccentric sleeve 45, thereby raising shaft 43 and roll 28. Cam 53 is similarly operative for raising shaft 47 and roll 30.

Lower strip 23 is directed from feed rolls 28, 29 to mandrel 21 over table 54 and under plate 55 which are supported on stud 56 reaching out from an ear on sub-base 9.

Paste supply.

Figure 2:
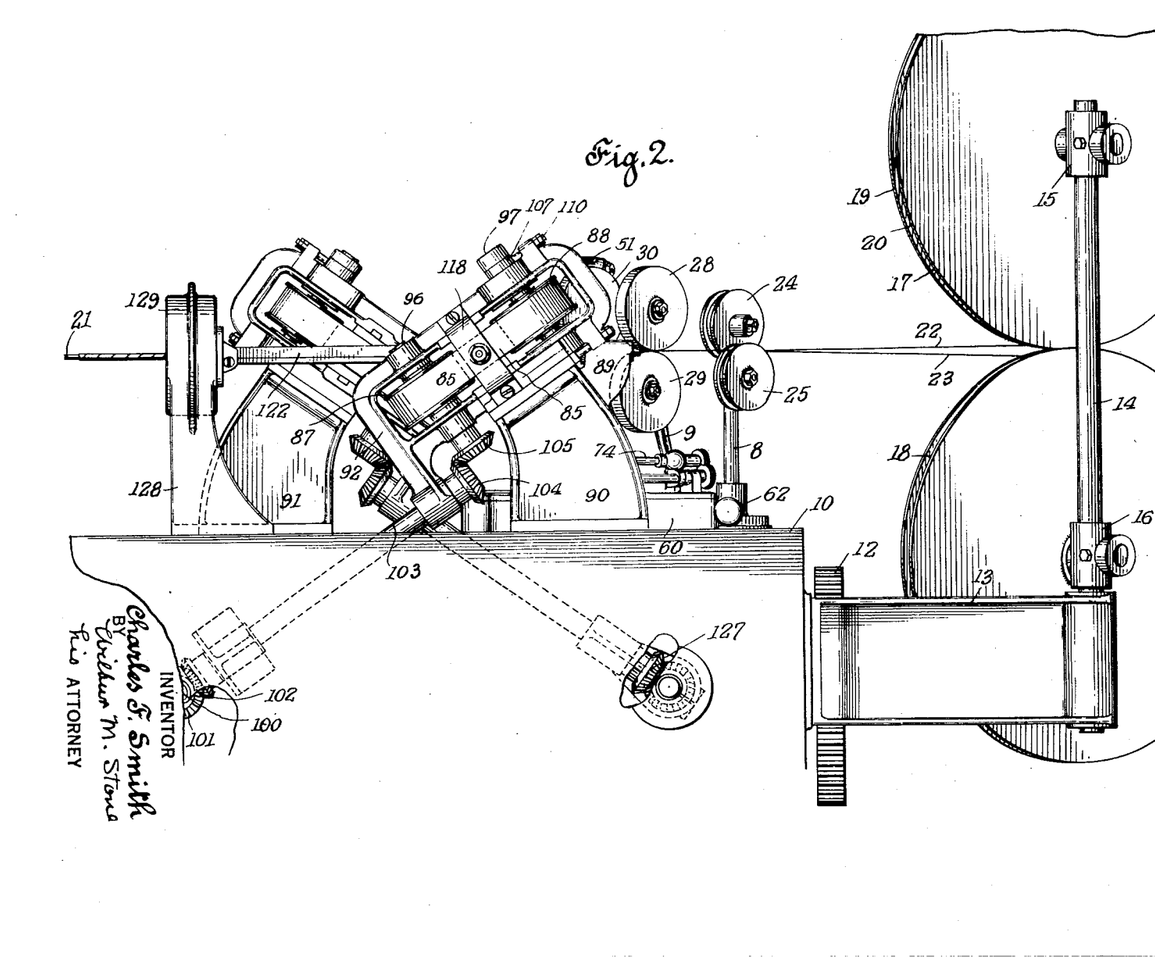
Fig. 2 is a front elevation corresponding with what is shown in Fig. 1.

In front of sub-base 9, container 60, for a suitable adhesive such as paste, is removably mounted on base 10, Figs. 2, 3 and 4. One end of said container hooks under ear 61 of base 10 and the other end is secured by pin 62, engaging ears on the container and on the base. Paste rolls 63 and 67 are removably mounted for coaction on parallel shafts 64 and 68 respectively, having relatively fixed axes, in vertically removable slide 69. Said slide has its seat in bracket 70 upstanding from base 10. Paste lifting roll 63 is partially immersed in the paste in container 60 and is provided with scraper 65 adjustable horizontally by screw 66. Paste delivery roll 67, above roll 63, has the upper portion of its periphery in contact with the under face of strip 22 for delivering paste thereto. For regulating the amount of paste delivered from roll 67 to the strip, scraper 72 is pivoted at 73 on sub-base 9. The lower end of said scraper is pivoted to one end of rod 74, the other end thereof passing through hollow screw 75, but held against endwise movement relative thereto. Said screw 75, by means of hand-button 76, may be rotated in swivelly mounted nut 760 for moving rod 74 endwise to adjust scraper 72. Said rolls are removably fixed to their respective shafts by some known means, such as lock coupling 68ª to shaft 68.

Said paste rolls are driven from main shaft 11 by miter gear 57 thereon, engaging miter gear 58 on the lower end of vertical shaft 59, Fig. 1. To the upper end of shaft 59 is fixed miter gear 77 driving miter gear 78 fixed to the rear end of shaft 79 turning in bracket 80, upstanding from base 10. To the forward end of said shaft 79 is fixed spur gear 81 meshing with similar gear 82 thereabove on shaft 83, which shaft also has its bearing in bracket 80. Power is transmitted from shaft 83 to upper paste roll shaft 68 through slidable coupling 84. Lower shaft 79 is similarly coupled to lower roll shaft 64 so that slide 69 and paste rolls 63, 67 may be lifted free of paste container 60 and away from the machine, for cleaning. Said slide 69 may be secured in any vertically adjusted position by gib screw 106.

Tube forming mechanism.

Figure 6:
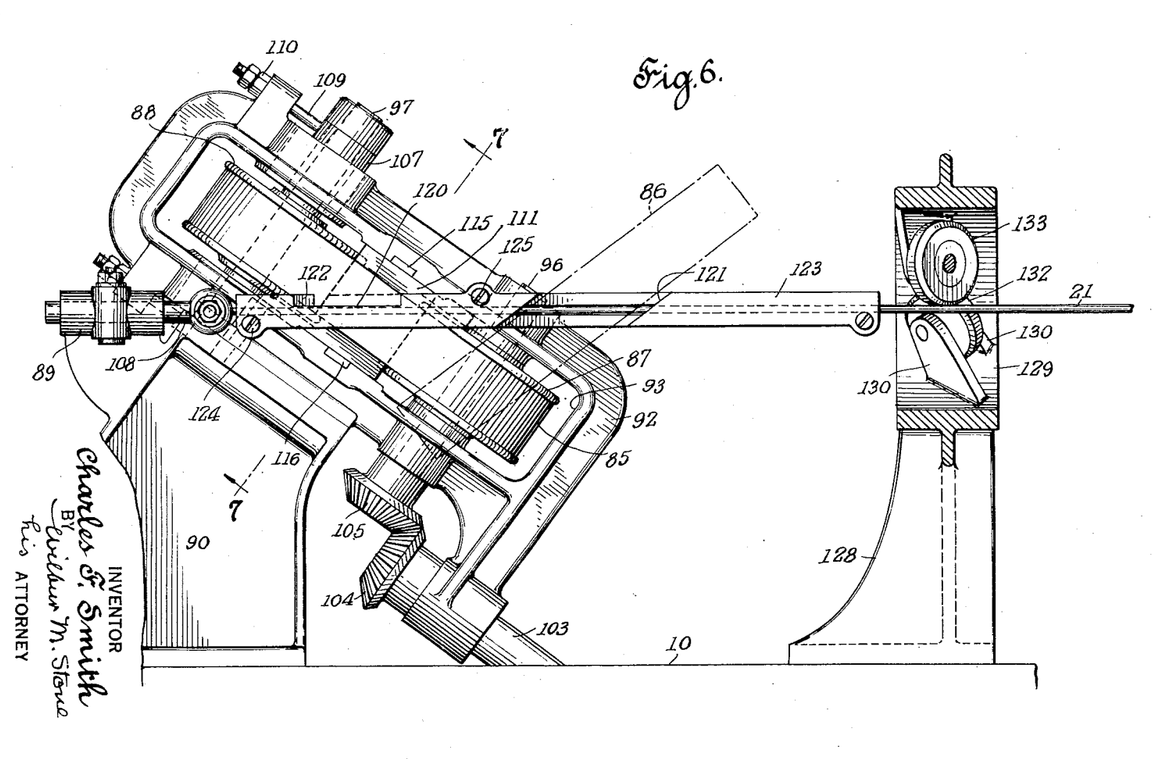
Fig. 6 is a rear elevation, looking in the direction of arrow 6 in Fig. 1 and showing a portion of the mechanism of that figure.

This mechanism operates upon the simple principle of rolling a tube between the two hands, the hands being moved angularly in opposite directions in the respective directions of the front and back spiral lay of the tube. The tube is formed from strips 23 and 22 overlaying fixed mandrel 21, by means of two elements which hold the tube between them as between a pair of hands, and which elements move continuously in opposite oblique directions in parallelism respectively with the spiral lay of the tube at their opposite points of contact therewith. Said elements preferably comprise short endless belts 85, 86, Fig. 9, their tube contacting portions being for convenience arranged in vertical planes respectively on opposite sides of said tube. These belts are carried on and driven by pulleys arranged in pairs, as pulleys 87, 88 to belt 85, Figs. 1 and 2. As best shown in Fig. 6 these belts lie at opposite angles, oblique to the axis of the mandrel and tube and in parallelism with the spiral lay of the tube at their lines of tangency therewith respectively. These belts and their supporting devices are carried on brackets 90, 91 which are substantial opposite duplicates of one another. These brackets stand on base 10, and front bracket 90, has ear 89 projecting to the right, Figs. 1 and 2, for firmly holding the right hand end of mandrel 21. The other end of said mandrel is unsupported, so that the finished tube may pass freely therefrom.

Directing attention now particularly to Fig. 6, wherein front belt 85 and its mechanism is clearly shown in rear elevation, bracket 90 carries on its inclined upper face pulley frame 92, within opening 93 therethrough pulleys 87, 88 are fixed to shafts 96, 97 respectively. Shaft 96 has fixed bearings in opposite arms of said frame 92 and is driven from main shaft 11 through miter gear 98, Fig. 1, fixed to said main shaft and meshing with miter gear 99 fixed to the rear end of horizontal shaft 100. To said shaft 100 is fixed miter gear 101 meshing with similar gear 102 fixed to the lower end of upwardly inclined shaft 103, and to the upper end of said shaft is fixed miter gear 104 meshing with similar gear 105 fixed to the lower end of pulley shaft 96, Fig. 6. For applying tension to belt 85, bearings 107, 108 of shaft 97 of pulley 88, are slidable in the upper end of pulley frame 92 and may be adjusted by means of bolts, as 109 and nuts 110, to bearing 107.

Belt 86, on bracket 91, is similarly mounted and actuated from shaft 11, through the train of gearing near the right hand end of Fig. 1, indicated in a general way by 126, 127. The belt carrying pulleys, as 87, 88, may be of such a diameter as to drive the belts, as belt 85, at the same surface speed as the speed of the angular delivery of the strips onto and about the mandrel, but in some cases I have found it desirable to drive said belts at a speed slightly in excess of the speed of the strip delivery onto the mandrel and in some cases to drive rear belt 86 slightly faster than front belt 85. This increased speed of the belts over the speed of strip feed tends to lay the strips snugly together about the mandrel, while rotating and advancing the formed tube on the mandrel.

Figures 7, 8, 9, 10:
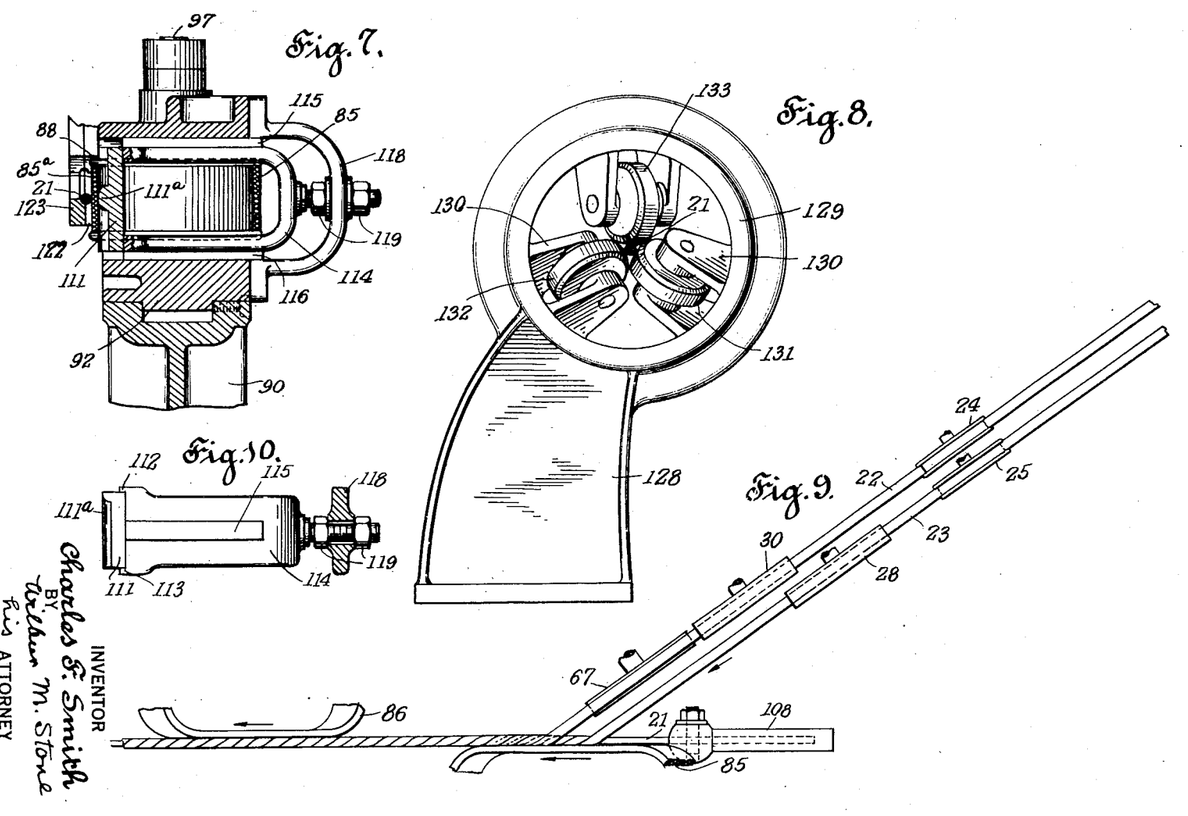
Fig. 7 is an oblique section on line 7—7 of Fig. 6.
Fig. 8 is an end elevation of the tube guide stand shown at the right of Fig. 6.
Fig. 9 is a fragmentary plan view of a detail of Fig. 1.
Fig. 10 is a detail plan view of a portion of what is shown in Fig. 7.

For urging the tube engaging face 85$^a$ of belt 85 to engagement with the tube on mandrel 21 a belt pressing shoe 111, best shown in Figs. 7 and 10, is employed. Said shoe lies about midway between pulleys 87 and 88 within the loop of the belt and against the inside face of the tube engaging portion 85$^a$ thereof. The belt contacting rib 111$^a$ of said shoe lies angularly relative to its body 111 and in parallelism with the tube and mandrel so as to press a maximum length of the belt against the tube.

Said shoe is maintained in operative position by opposite ears as 112, 113 on the horns of horse-shoe shaped presser 114. Said shoe presser 114 is guided by opposite ribs 115, 116 thereof, slidable in suitable channels in frame 92, Fig. 6. For adjustably urging presser 114 against shoe 111, screw 117 projects from the outer loop portion of said presser through yoke 118, which spans opening 93 in frame 92 and is fixed to said frame. Nuts 119, 119 engage said screw 117 on either side of yoke 118.

That portion of mandrel 21 on which the tube is formed is partly enclosed by a casing comprising front and back plates 122, 123, Figs. 6 and 7, each having a lengthwise half cylindrical bore, through which bore mandrel 21 extends. Said bore is enough larger in diameter than the diameter of the mandrel to permit the free passage of the tube outside the mandrel and inside said bore. Said plates are removably held together and secured to frame 92 by screws 124, 125. In Fig. 6 said plates are shown cut away at 120 to admit the paper strips to mandrel 21 and rear plate 123 is cut away at 121 to admit belt 86 to contact with the tube. Front plate 122 is similarly cut away to admit belt 85 to engage the tube.

Ironing and delivery.

To the left of Fig. 2 and right of Fig. 6, bracket 128 on base 10 terminates upwardly in cylindrical cage 129, projecting inwardly from which are ears as 130, 130 between which are freely pivoted ironing rollers 131, 132, 133, Fig. 8, respectively. These rollers are mounted in skewed relation so as to engage the tube in the line of its spiral progress and support and press its two members into intimate contact.

From said mechanism the tube passes to cutting mechanism not shown, but which will form the subject matter of a subsequent application.

From the foregoing detail description it is believed that the operation of the machine will be obvious, therefore, referring to Fig. 9, suffice it to state that the paper strips are guided from supply rolls 18, 19 by small rolls 24, 25 to the two sets of feed rolls 28, 29 and 30, 31 respectively and that strip 22 is supplied with paste on its under face by paste wheel 67. That strip 23 is first passed spirally over and downwardly about fixed mandrel 21 and thereafter gummed strip 22 is wrapped spirally over and downwardly about strip 23, belt 85 first acting on one side against the strips about the mandrel, followed by the operation of belt 86 on the other side, for rotating and advancing the tube-forming strips. The formed tube then passes onward within plates 122, 123 and thence between skewed rolls 131, 132, 133 to delivery.

I claim:

1. In a machine of the character specified the combination of means for supporting a plurality of rolls of strip material, a mandrel, having a free end, about which said strip material is adapted to be wound, means for advancing each strip of material from its supply roll to said mandrel, means for applying an adhesive to one of said strips, including an adhesive container, a vertically adjustable and removable slide having upper and lower transverse shafts journaled therein, means for supporting said slide, an adhesive lifting roll fixed to said lower shaft, said lower roll being located and adapted for lifting adhesive from the container, an adhesive delivery roll fixed to said upper shaft, said rolls being in peripheral coaction for transferring adhesive from the lower roll to the upper roll, means for governing the amount of adhesive transferred from the lower roll to the upper roll, means for governing the amount of adhesive delivered by the upper roll and means for driving each of said shafts.

2. In a machine of the character specified the combination of means for supporting a plurality of rolls of strip material, a mandrel, having a free end, about which said strip material is adapted to be wound, means for advancing each strip of material from its supply roll to said mandrel, means for applying an adhesive to one of said strips, including an adhesive container, a vertically adjustable and removable slide having upper and lower transverse shafts journaled therein, means for supporting said slide, an adhesive lifting roll removably fixed to said lower shaft, said lower roll being located and adapted for lifting adhesive from the container, an adhesive delivery roll removably fixed to said upper shaft, said rolls being in peripheral coaction for transferring adhesive from the lower roll to the upper roll and means for governing the amount of adhesive transferred from the lower roll to the upper roll.

3. In a machine of the character specified the combination of means for supporting a plurality of rolls of strip material, a mandrel, having a free end, about which said strip material is adapted to be wound, means for advancing each strip of material from its supply roll to said mandrel and means, oppositely arranged relatively to said mandrel, movable angularly in opposite directions respectively relatively to said mandrel for engaging strips superposed spirally about said mandrel for forming a tube, and for rotating and advancing said tube along said mandrel.

4. In a machine of the character specified the combination of means for supporting a plurality of rolls of strip material, a mandrel, having a free end, about which said strip material is adapted to be wound, means for advancing said strips independently in parallelism from their respective rolls, in angular relation to said mandrel, the second of said strips being spaced from the first thereof and delivered in such angular relation to said mandrel as to cause said second strip to overlap the adjacent edges of the convolutions of the first strip about the mandrel and means, oppositely arranged relatively to said mandrel, movable angularly in opposite directions respectively relatively to said mandrel for engaging strips superposed spirally about said mandrel for forming a tube, and for rotating and advancing said tube along said mandrel.

5. In a machine of the character specified the combination of means for supporting a plurality of rolls of strip material, a mandrel, having a free end, about which said strip material is adapted to be wound, means for advancing each strip of material from its supply roll to said mandrel, means for supplying an adhesive between said strips and a pair of belts oppositely disposed relatively to said mandrel for engaging a tube on said mandrel and having their tube engaging portions movable in opposite angular directions relatively to said mandrel.

6. In a machine of the character specified the combination of means for supporting a plurality of rolls of strip material, a mandrel, having a free end, about which said strip material is adapted to be wound, means for advancing each strip of material from its supply roll to said mandrel, means for supplying an adhesive between said strips and a pair of endless belts mounted for movement in the direction of their lengths respectively, oppositely disposed relatively to said mandrel for engaging a tube on said mandrel and having their tube engaging portions movable in opposite angular directions relatively to said mandrel.

7. In a machine of the character specified the combination of means for supporting a plurality of rolls of strip material, a mandrel, having a free end, about which said strip material is adapted to be wound, means for advancing said strips independently in parallelism from their respective rolls, in angular relation to said mandrel, the second of said strips being spaced from the first thereof and delivered in such angular relation to said mandrel as to cause said second strip to overlap the adjacent edges of the convolutions of the first strip about the mandrel, means for supplying an adhesive between said strips and a pair of belts, oppositely disposed relatively to said mandrel for engaging a tube on said mandrel and having their tube engaging portions movable in opposite angular directions relatively to said mandrel.

8. In a machine of the character specified the combination of means for supporting a plurality of rolls of strip material, a mandrel, having a free end, about which said strip material is adapted to be wound and means, oppositely arranged relatively to said mandrel, movable angularly in opposite directions respectively relatively to said mandrel for engaging strips superposed spirally about said mandrel for forming a tube, and for rotating and advancing said tube along said mandrel.

9. In a machine of the character specified the combination of means for supporting a plurality of rolls of strip material, a mandrel, having a free end, about which said strip material is adapted to be wound and a pair of endless belts mounted for movement in the direction of their lengths respectively, oppositely disposed relatively to said mandrel for engaging a tube on said mandrel and having their tube engaging portions movable in opposite angular directions relatively to said mandrel.

10. In a machine of the character specified the combination of means for supporting a plurality of rolls of strip material, a mandrel, having a free end, about which said strip material is adapted to be wound, an endless belt mounted for movement on opposite pulleys, said belt being angularly disposed relatively to said mandrel, one portion of said belt being positioned and adapted for engaging a tube on said mandrel, a presser shoe between the opposite runs of said belt and between said pulleys and means for adjusting said shoe for causing it to press said belt toward said mandrel.

11. In a machine of the character specified the combination of means for supporting a plurality of rolls of strip material, a mandrel, having a free end, about which said strip material is adapted to be wound, an endless belt mounted for movement on opposite pulleys, said belt being angularly disposed relatively to said mandrel, one portion of said belt being positioned and adapted for engaging a tube on said mandrel, a presser shoe between the opposite runs of said belt and between said pulleys and means for adjusting said shoe for causing it to press said belt toward said mandrel, the belt engaging portion of said shoe being parallel with said mandrel.

12. In a machine of the character specified the combination of means for supporting a plurality of rolls of strip material, a mandrel, having a free end, about which said strip material is adapted to be wound, means for advancing each strip of material from its supply roll to said mandrel, means for wrapping the first strip angularly about said mandrel and the second strip angularly about the first strip, a supporting conduit for said mandrel having opposite openings therein to permit access of said wrapping means to a tube on said mandrel and an opening in said conduit for permitting access of said strips to said mandrel.

13. In a machine of the character specified the combination of means for supporting a plurality of rolls of strip material, a mandrel, having a free end, about which said strip material is adapted to be wound, means for advancing each strip of material from its supply roll to said mandrel, means oppositely arranged relatively to said mandrel, movable angularly in opposite directions respectively relatively to said mandrel for engaging strips superposed spirally about said mandrel for forming a tube, said oppositely arranged means being efficient for rotating and advancing said tube along said mandrel and a frame in which are rotatably mounted a plurality of angularly disposed rollers spaced about said mandrel and having their tube engaging peripheral portions respectively angularly disposed so as to roll against the tube in line with its spiral advancement.

14. In a machine of the character specified the combination of means for supporting a plurality of rolls of strip material, a mandrel, having a free end, about which said strip material is adapted to be wound, means for advancing each strip of material from its supply roll to said mandrel and means, oppositely arranged relatively to said mandrel, movable angularly in opposite directions respectively relatively to said mandrel for engaging strips superposed spirally about said mandrel for forming a tube, said oppositely arranged means being efficient for rotating and advancing said tube along said mandrel, said oppositely arranged means being moved at a speed in excess of the speed of delivery of said strips to said mandrel.

15. In a machine of the character specified the combination of means for supporting a plurality of rolls of strip material, a mandrel, having a free end, about which said strip material is adapted to be wound, means for advancing each strip of material from its supply roll to said mandrel and means, oppositely arranged relatively to said mandrel, movable angularly in opposite directions respectively relatively to said mandrel for engaging strips superposed spirally about said mandrel for forming a tube, said oppositely arranged means being efficient for rotating and advancing said tube along said mandrel, one of said oppositely arranged means being moved at a speed in excess of the speed of delivery of said strips to said mandrel and the other of said oppositely arranged means being moved at a speed in excess of the speed of the first mentioned oppositely arranged means.

In witness whereof, I hereby affix my signature this 7th day of September, 1926.

CHARLES F. SMITH.